US006934843B2

(12) United States Patent
Pockrandt

(10) Patent No.: US 6,934,843 B2
(45) Date of Patent: Aug. 23, 2005

(54) METHOD FOR AUTHENTICATING AT LEAST ONE SUBSCRIBER DURING A DATA INTERCHANGE

(75) Inventor: Wolfgang Pockrandt, Reichertshausen (DE)

(73) Assignee: Infineon Technologies AG, Munich (DE)

( * ) Notice: Subject to any disclaimer, the term of this patent is extended or adjusted under 35 U.S.C. 154(b) by 672 days.

(21) Appl. No.: 09/815,202

(22) Filed: Mar. 22, 2001

(65) Prior Publication Data

US 2001/0021975 A1 Sep. 13, 2001

Related U.S. Application Data

(63) Continuation of application No. PCT/EP99/06664, filed on Sep. 9, 1999.

(30) Foreign Application Priority Data

Sep. 22, 1998 (EP) .............................................. 98117939

(51) Int. Cl.$^7$ ................................................. H04L 9/00
(52) U.S. Cl. ........................ 713/169; 713/170; 713/171; 713/172; 713/184; 705/65; 705/66; 705/75
(58) Field of Search ................................ 713/169, 170, 713/171, 172, 184, 200; 380/259, 260, 262, 264, 268, 278, 282; 705/65, 66, 75

(56) References Cited

U.S. PATENT DOCUMENTS

| | | | | |
|---|---|---|---|---|
| 5,288,978 A | * | 2/1994 | Iijima .......................... 235/380 |
| 5,473,689 A | * | 12/1995 | Eberhard ..................... 713/169 |
| 5,761,309 A | * | 6/1998 | Ohashi et al. ............... 713/156 |
| 5,799,085 A | * | 8/1998 | Shona ......................... 713/169 |
| 5,857,024 A | * | 1/1999 | Nishino et al. .............. 713/172 |
| 5,917,168 A | * | 6/1999 | Nakamura et al. .......... 235/379 |
| 5,991,412 A | * | 11/1999 | Wissenburgh et al. ........ 705/67 |
| 6,018,581 A | * | 1/2000 | Shona et al. ................... 380/46 |
| 6,073,236 A | * | 6/2000 | Kusakabe et al. ........... 713/169 |
| 6,076,164 A | * | 6/2000 | Tanaka et al. .............. 713/185 |
| 6,178,507 B1 | * | 1/2001 | Vanstone ..................... 713/169 |
| 6,298,442 B1 | * | 10/2001 | Kocher et al. ............... 713/194 |

FOREIGN PATENT DOCUMENTS

| | | | |
|---|---|---|---|
| DE | 43 39 460 C1 | 4/1995 | |
| EP | 0440158 A1 | * 7/1991 | ............ G11B/5/80 |
| JP | 62 190 585 A | 8/1987 | |
| JP | 06 289 782 A | 10/1994 | |
| JP | 10 069 222 A | 3/1998 | |
| WO | WO97/15161 | 4/1997 | |

* cited by examiner

Primary Examiner—Gregory A. Morse
Assistant Examiner—Tongoc Tran
(74) Attorney, Agent, or Firm—Laurence A. Greenberg; Werner H. Stemer; Ralph E. Locher

(57) ABSTRACT

A method for authenticating at least one subscriber during a data interchange between at least two subscribers is described. In the method, a first subscriber transmits a first data item (a challenge signal) to a second subscriber, the second subscriber processes the first data item using an algorithm to give a second data item and transmits it to the first subscriber, which checks it for its correctness. At the same time as the first data item is being processed using the algorithm, at least one other processing operation on the first data item is carried out.

7 Claims, 1 Drawing Sheet

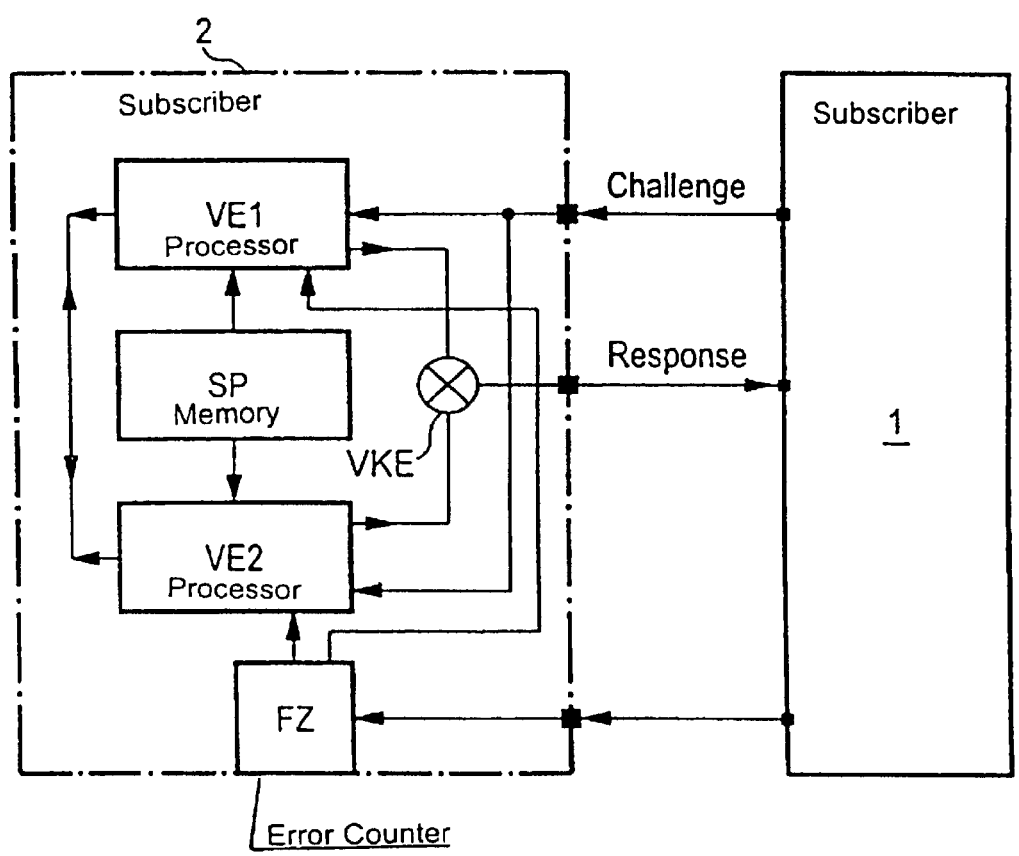

METHOD FOR AUTHENTICATING AT LEAST ONE SUBSCRIBER DURING A DATA INTERCHANGE

CROSS-REFERENCE TO RELATED APPLICATION

This application is a continuation of copending International Application No. PCT/EP99/06664, filed Sep. 9, 1999, which designated the United States.

BACKGROUND OF THE INVENTION

Field of the Invention

The invention relates to a method for authenticating at least one subscriber during a data interchange between at least two subscribers, in which a second subscriber transmits a first data item to a first subscriber. The first subscriber processes the first data item using an algorithm to give a second data item and transmits it to the second subscriber, and the second subscriber checks the second data item for its correctness.

Such methods are known from the document titled "Cryptographic Identification Methods for Smart Cards in the Process of Standardization" by Hanns-Peter Königs from IEEE Communications Magazine, Vol. 29, No. 6, June 1991, pp. 42–48. In the method in that document, a random number is se as the first data item from a read/write terminal to a smart card and is encrypted there using a secret algorithm and at least one secret number. The encrypted result is sent back from the smart card to the terminal and is either decrypted or likewise encrypted in the same way there. The respective result is compared with the random number sent initially or with the received second data item. A positive comparison result indicates that both subscribers involved in the data interchange have the correct algorithm and the correct secret numbers or the correct key, and are therefore authentic.

Authentication methods are used, in particular, when the data interchange involves monetary values or procedures that are critical for security. Such procedures are naturally subject to hacking. In this context, a hacker has the task of discovering the keys, secret numbers and algorithms that are involved. The flow of communication permits the type of authentication used to be inferred and thus allows the hacking to be carried out with guidance.

SUMMARY OF THE INVENTION

It is accordingly an object of the invention to provide a method for authenticating at least one subscriber during a data interchange that overcomes the above-mentioned disadvantages of the prior art methods of this general type, in which the authentication method carried out is hidden as well as possible.

With the foregoing and other objects in view there is provided, in accordance with the invention, a method for authenticating at least one first system part using a second system part in an information transmission system formed of a smart card and a read/write terminal. The method includes the steps of transmitting a challenge signal from the first system part to the second system part and processing the challenge signal in the second system part using an algorithm resulting in a response signal. At least one other processing operation is carried out on the challenge signal resulting in a further response signal. A final response signal derived from the result signal and/or the further result signal is transmitted to the first system part, and the first system part checks the validity of the final response signal.

The simultaneous execution of at least two processing procedures makes it much harder for a hacker to infer the internal flow of authentication from an examination of the time-dependent power consumption, for example.

In accordance with an added mode of the invention, there is the step of carrying out the other processing operation using a further algorithm.

In accordance with an additional mode of the invention, during the other processing operation, a comparison is made between the challenge signal and a prescribed random number.

In accordance with another mode of the invention, there is the step of logically combining the result signal with the further result signal for forming the final response signal.

In accordance with a further mode of the invention, there is the step of using one of the further response signal and an intermediate result of the further response signal in processing the challenge signal using the algorithm for generating the response signal.

In accordance with another added mode of the invention, there is the step of using one of the response signal and an intermediate result of the response signal for generating the further response signal.

In accordance with a concomitant mode of the invention, there is the step of using an error counter for limiting a number of processing procedures.

Other features which are considered as characteristic for the invention are set forth in the appended claims.

Although the invention is illustrated and described herein as embodied in a method for authenticating at least one subscriber during a data interchange, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a block diagram of a data interchange system according to the invention.

DESCRIPTION OF THE PREFERRED EMBODIMENTS

Referring now to the single FIGURE of the drawing in detail, there is shown a basic illustration of a data interchange system. The data interchange system has a first subscriber 1, which may be a read/write terminal 1, for example, and a second subscriber 2, which is intended to be a smart card 2 in the example. In the example explained below, the second subscriber 2, that is to say the card 2, needs to authenticate itself with respect to the first subscriber 1, the read/write terminal 1. For this reason, only the necessary circuit devices are shown in the card 2. If the read/writer terminal 1 also needs to authenticate itself with respect to the card 2, the terminal 1 would also need to have appropriate circuit devices.

First, the terminal 1 sends a first data item, a so-called challenge signal, to the card 2. According to the invention, the challenge signal is supplied both to a first processing device VE1 and to a second processing device VE2 on the card. To process the challenge signal as required for the authentication, the necessary information such as secret numbers or keys is supplied to the processing devices VE1, VE2 from a memory area SP.

The processing operation itself may either be a simple comparison between the challenge signal and an expected value which is stored in the memory area SP, or else a complicated encryption operation, for example on the basis of the DES or RSA algorithm. For this purpose, the processing units VE1, VE2 would be in the form of complex microprocessors having associated crypto-coprocessors. Frequent use is made of single-use encryption apparatuses produced as hardware which, by way of example, are formed using a shift register with feedback.

The output data from the processing devices VE1, VE2 are supplied to a logic combination device whose output signal is forwarded to the terminal 1 as a response. The logic combination device VKE does not necessarily have to logically combine the output data items from the processing devices VE1, VE2 with one another, but instead can also let through just the output data item from the first processing device VE1 in unmodified form as a response and can block the output data item from the second processing device VE2, since the fundamental aspect of the invention is the simultaneous execution of at least two, preferably different, processing processes so that it is not possible to infer the internal structure and the associated data from the power consumption, for example.

It is advantageous, however, if the output data items from the processing devices VE1, VE2 are logically combined with one another using an EXOR gate which forms the logic combination device VKE, for example.

The block diagram in the FIGURE also shows the logic combination of the two processing units VE1, VE2, which is a development according to the invention. In this case, logic combination means that the intermediate result or final result of the data processing in one processing unit is included in the processing of the other processing unit. In this context, in a first development of the invention, output data from just one processing unit can be taken into account in the other processing unit, and in another development, output data from both processing units can be taken into account in the other processing unit.

As already stated in the introduction to the description, the correctness of the response can be checked in the terminal 1 in different ways. A few options for doing this are illustrated and explained in detail in the document already cited, and for this reason are not set out in more detail in the FIGURE.

In another embodiment of the invention, an error counter FZ is provided which records the number of negative comparison results and blocks the processing devices VE1, VE2 at a particular preset number, so that no further authentication and hence no further data interchange between the terminal 1 and the card 2 can take place. This ensures that it is not possible to carry out an unlimited number of attempts in order to examine the authentication procedure.

I claim:

1. A method for authenticating at least one first system part using a second system part in an information transmission system formed of a smart card and a read/write terminal, which comprises the steps of:

transmitting a challenge signal from the first system part to the second system part;

processing the challenge signal in the second system part using an algorithm resulting in a response signal;

during the processing step, carrying out at least one other processing operation on the challenge signal resulting in a further response signal;

transmitting a final response signal derived from at least one of the response signal and the further response signal to the first system part, and the first system part checks a validity of the final response signal.

2. The method according to claim 1, which comprises carrying out the other processing operation using a further algorithm.

3. The method according to claim 1, which comprises during the other processing operation, a comparison is made between the challenge signal and a prescribed random number.

4. The method according to claim 1, which comprises logically combining the result signal with the further result signal for forming the final response signal.

5. The method according to claim 1, which comprises using one of the further response signal and an intermediate result of the further response signal in processing the challenge signal using the algorithm for generating the response signal.

6. The method according to claim 1, which comprises using one of the response signal and an intermediate result of the response signal for generating the further response signal.

7. The method according to claim 1, which comprises using an error counter for limiting a number of processing procedures.

* * * * *